(12) United States Patent
Hasegawa (10) Patent No.: US 11,436,768 B2
(45) Date of Patent: Sep. 6, 2022

(54) ELECTRONIC DEVICE AND DISPLAY METHOD

(71) Applicant: CASIO COMPUTER CO., LTD., Tokyo (JP)

(72) Inventor: Kosuke Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 50 days.

(21) Appl. No.: 16/590,139

(22) Filed: Oct. 1, 2019

(65) Prior Publication Data

US 2020/0105034 A1 Apr. 2, 2020

(30) Foreign Application Priority Data

Oct. 2, 2018 (JP) .............................. JP2018-187171

(51) Int. Cl.
*G06T 11/20* (2006.01)
*G06F 3/048* (2013.01)

(52) U.S. Cl.
CPC .......... *G06T 11/206* (2013.01); *G06F 3/048* (2013.01)

(58) Field of Classification Search
CPC .......... G06F 3/14; G06F 1/163; G06F 3/0346; G06F 3/044; G06F 3/048; G06T 11/206; H04M 1/00; G09G 3/36; G09G 2330/02; G09G 2354/00
See application file for complete search history.

(56) References Cited

U.S. PATENT DOCUMENTS

| | | | | |
|---|---|---|---|---|
| 4,835,716 A | * | 5/1989 | Tamaki | G01C 13/008 702/50 |
| 5,675,370 A | * | 10/1997 | Austin | B41J 2/355 347/188 |
| 5,737,246 A | * | 4/1998 | Furukawa | G04G 21/02 702/166 |
| 5,774,167 A | * | 6/1998 | Hara | G06K 15/02 347/131 |
| 6,516,221 B1 | * | 2/2003 | Hirouchi | A61B 5/0537 600/547 |

(Continued)

FOREIGN PATENT DOCUMENTS

| | | |
|---|---|---|
| JP | H08068873 A | 3/1996 |
| JP | H09044454 A | 2/1997 |

(Continued)

OTHER PUBLICATIONS

Japanese Office Action dated Jun. 28, 2022 (and English translation thereof) issued in counterpart JP Application No. 2018-187171.

*Primary Examiner* — Abderrahim Merouan
(74) *Attorney, Agent, or Firm* — Holtz, Holtz & Volek PC (57) ABSTRACT

An electronic device includes a display, a sensor, and a processor. The sensor measures a predetermined physical amount. The processor can change an obtaining interval at which the processor obtains measurement results of the measurement by the sensor; causes the display to display a graph that shows a shift in the measurement results; and in causing the display to display the graph, changes a display mode of the graph in a section in the graph depending on the obtaining interval. The display does not display a mark representing the obtaining interval while displaying the graph.

19 Claims, 5 Drawing Sheets

(56) References Cited

U.S. PATENT DOCUMENTS

| | | | | |
|---|---|---|---|---|
| 6,934,657 | B1* | 8/2005 | Carlson | G01K 1/02 |
| | | | | 181/124 |
| 7,006,406 | B2* | 2/2006 | Fujimoto | G01S 7/6218 |
| | | | | 367/112 |
| 7,399,277 | B2* | 7/2008 | Saidara | A61B 5/7275 |
| | | | | 600/300 |
| 8,775,120 | B2* | 7/2014 | Molettiere | A63B 71/0686 |
| | | | | 702/160 |
| 9,103,945 | B2* | 8/2015 | Miyake | G04G 21/02 |
| 9,459,593 | B2* | 10/2016 | Miwa | G04R 60/12 |
| 10,094,918 | B2* | 10/2018 | Nickel | G01S 15/93 |
| 10,772,503 | B2* | 9/2020 | Raisoni | A61B 5/002 |
| 2001/0043514 | A1* | 11/2001 | Kita | G06F 1/163 |
| | | | | 368/281 |
| 2002/0027669 | A1* | 3/2002 | Nagatomi | H04N 1/40006 |
| | | | | 358/1.9 |
| 2005/0038332 | A1* | 2/2005 | Saidara | A61B 5/0002 |
| | | | | 600/347 |
| 2007/0123787 | A1* | 5/2007 | Kitajima | A61B 5/02416 |
| | | | | 600/509 |
| 2008/0255438 | A1* | 10/2008 | Saidara | G16H 40/63 |
| | | | | 600/365 |
| 2009/0048959 | A1* | 2/2009 | Omura | G06Q 40/02 |
| | | | | 705/35 |
| 2009/0208734 | A1* | 8/2009 | Macfie | G01N 27/3272 |
| | | | | 428/332 |
| 2011/0158529 | A1* | 6/2011 | Malik | H04N 19/59 |
| | | | | 382/173 |
| 2011/0172547 | A1* | 7/2011 | Izumi | A61B 5/022 |
| | | | | 600/490 |
| 2011/0193704 | A1* | 8/2011 | Harper | A61B 5/14 |
| | | | | 340/573.1 |
| 2012/0212493 | A1* | 8/2012 | Taylor | G06T 11/20 |
| | | | | 345/440.2 |
| 2012/0271557 | A1* | 10/2012 | Sekimoto | G16H 40/63 |
| | | | | 702/19 |
| 2013/0310712 | A1* | 11/2013 | Kanemitsu | A61B 5/11 |
| | | | | 600/595 |
| 2016/0012621 | A1* | 1/2016 | Kanada | G06Q 10/1091 |
| | | | | 345/440 |
| 2016/0345874 | A1* | 12/2016 | Raisoni | A61M 5/1723 |

FOREIGN PATENT DOCUMENTS

| | | |
|---|---|---|
| JP | H02055034 A | 1/1998 |
| JP | H11248840 A | 9/1999 |
| JP | 2010005139 A | 1/2010 |
| JP | 2014132253 A | 7/2014 |

* cited by examiner

ELECTRONIC DEVICE AND DISPLAY METHOD

CROSS-REFERENCE TO RELATED APPLICATIONS

This application is based upon and claims the benefit of priority from the prior Japanese Patent Application No. 2018-187171, filed on Oct. 2, 2018, the entire contents of which are incorporated herein by reference.

BACKGROUND

The technical field of the present application relates to an electronic device and a display method.

There are small portable electronic devices that have a small digital display screen (display) and can perform digital display. As disclosed, for example, in JP H09-44454 A, an electronic device greatly limited in terms of display due to, for example, a size and performance of its digital display screen performs display control to improve understandability of display contents with limited resources.

As such a small portable electronic device, there are electronic timepieces, such as watches. Among electronic timepieces that have a physical sensor and can display measurement results obtained thereby, there is an electronic timepiece that can display a graph showing a shift in the measurement results with time on its digital display screen.

However, while such an electronic device displays the graph on the display (digital display screen), which has a limited size and performance, if a measurement interval(s) at which the physical sensor performs measurement is changed, the graph becomes difficult to understand.

SUMMARY

One or more embodiments herein disclose an electronic device and a display method.

According to an embodiment(s), there is provided an electronic device including:
 a display;
 a sensor that measures a predetermined physical amount; and
 a processor that:
  can change an obtaining interval at which the processor obtains measurement results of the measurement by the sensor; and
  causes the display to display a graph that shows a shift in the measurement results; and
  in causing the display to display the graph, changes a display mode of the graph in a section in the graph depending on the obtaining interval, wherein
 the display does not display a mark representing the obtaining interval while displaying the graph.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles of the present invention, wherein.

DETAILED DESCRIPTION

Hereinafter, one or more embodiments will be described with reference to the drawings.

Figure 1:
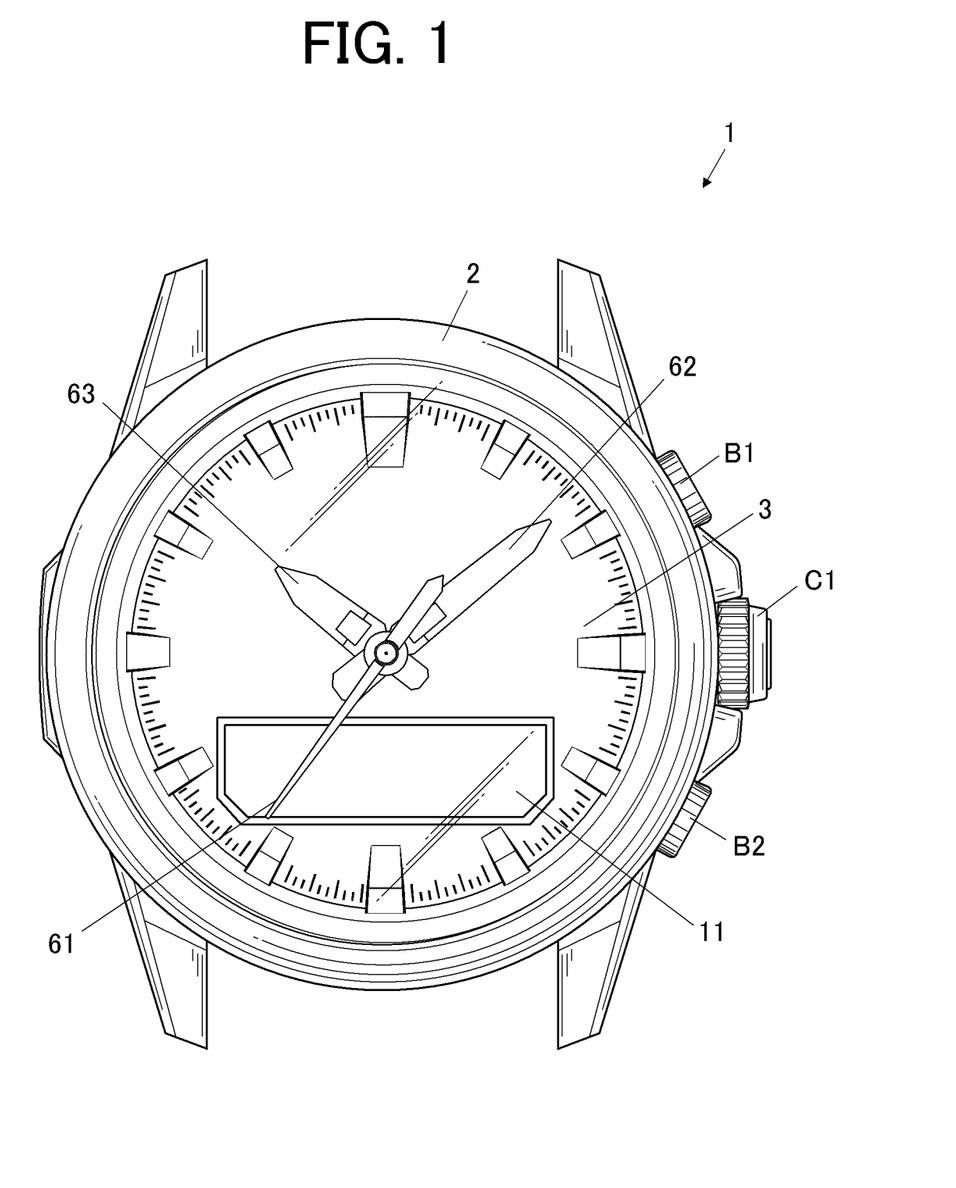
FIG. 1 is a front view of an electronic timepiece according to an embodiment of the present invention.

FIG. 1 is a front view of an electronic timepiece 1 according to an embodiment.

The electronic timepiece 1 includes a casing 2, a dial 3 (display plate), a not-shown windproof crystal that covers the front face of the dial 3, and a display unit 10 enclosed by these. The display unit 10 has a second hand 61, a minute hand 62, an hour hand 63, and a digital display screen 11 (display). The casing 2 has, on the lateral face, a crown C1 and push-button switches B1, B2. The second hand 61, the minute hand 62, and the hour hand 63 (which may be collectively called "hands 61 to 63" or the like) rotate on an axis position that is substantially the center of the dial 3. The digital display screen 11 is arranged in an area on the dial 3. In this embodiment, the digital display screen is a dot-matrix liquid crystal display screen and a monochromatic liquid crystal screen that can perform only black-and-white display in a single color. Some segment marks indicating display contents, such as representing afternoon, may be arranged at edge parts of the digital display screen 11.

Figure 2:
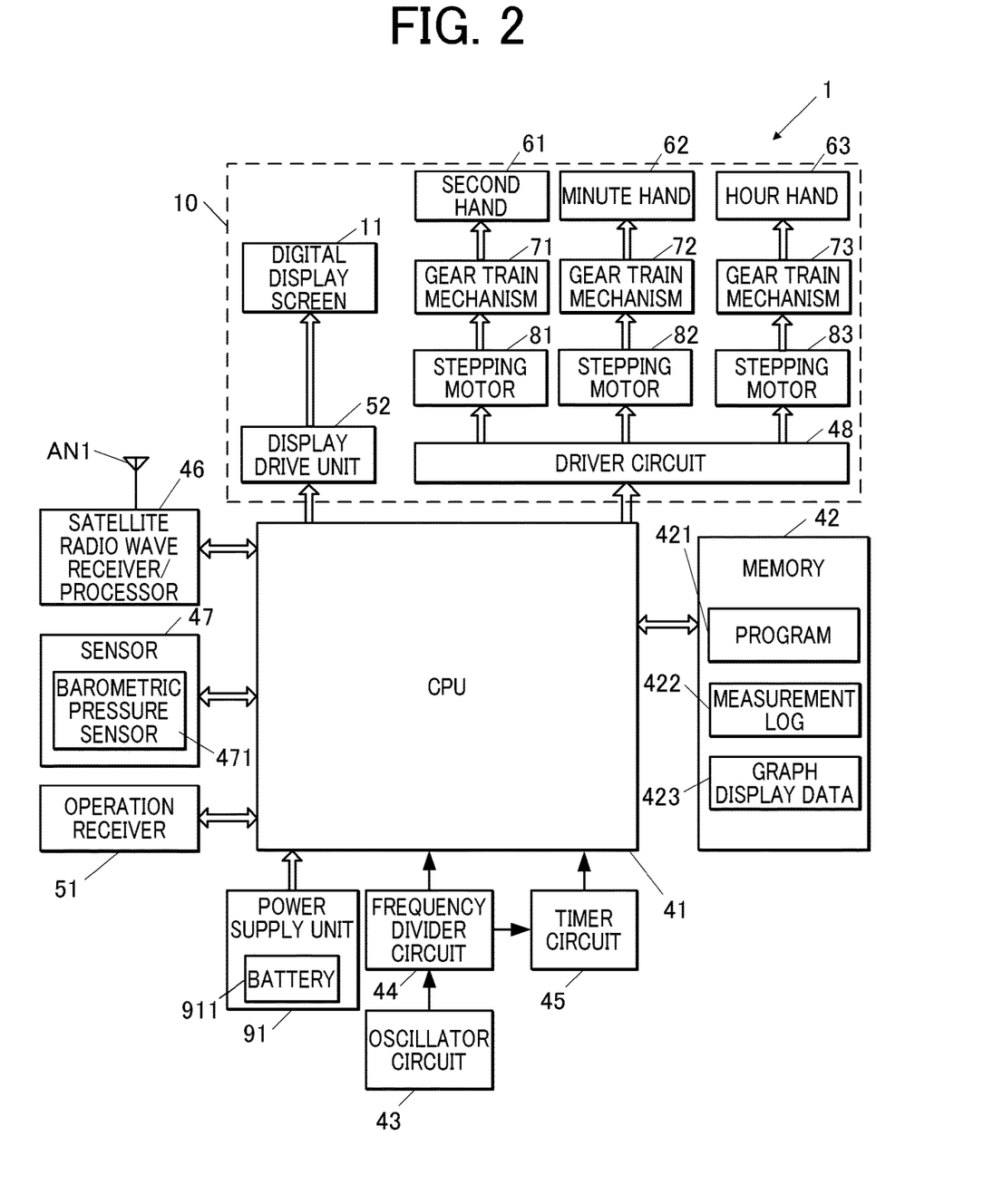
FIG. 2 is a block diagram showing functional configuration of the electronic timepiece.

The crown C1 receives operations input from a user(s). The crown C1 can be pulled from the casing 2 to a first level and a second level of two levels. Pulling the crown C1 to the first level or the second level and, in this state, rotating the crown C1 a predetermined unit angle output an operation signal to CPU 41 (FIG. 2). Such operation signals are used by the CPU 41 for various settings. The push-button switches B1, B2 receive press operations from the outside, for example, the user. Keeping pressing the push-button switch B1 or B2 a predetermined distance or more continuously outputs operation signals to the CPU 41.

FIG. 2 is a block diagram showing functional configuration of the electronic timepiece 1.

The electronic timepiece 1 includes a CPU 41 (processor), a memory 42, an oscillator circuit 43, a frequency divider circuit 44, a timer circuit 45, a satellite radio wave receiver/processor 46 and its antenna AN1, a sensor(s) 47, a driver circuit 48, the operation receiver 51, a display drive unit 52 that causes the digital display screen 11 to perform display, gear train mechanisms 71 to 73 and stepping motors 81 to 83 for the respective hands 61 to 63, and a power supply unit 91.

The CPU 41 is a processor that performs various types of arithmetic processing, and integrally controls overall operation of the electronic timepiece 1. The CPU 41 controls operation of the hands 61 to 63 in date-and-time display. The CPU 41 converts a date and time calculated by the timer circuit 45 into a proper local time as needed, and causes the hands 61 to 63 to display the set local time while a time display function is in an activated mode.

The CPU 41 obtains date-and-time information by causing the satellite radio wave receiver/processor 46 to operate, and obtains current position on the basis of the operation of the satellite radio wave receiver/processor 46. The CPU 41 corrects the date and time calculated by the timer circuit 45 on the basis of data of the obtained date and time. The CPU 41 can change settings of the local time on the basis of data of the obtained current position.

The memory 42 stores programs 421 for various types of control that are executed by the CPU 41, a measurement log 422, and graph display data 423, and provides the CPU 41 with a memory space for work. The memory space for work is defined on a RAM. The programs 421, setting data, and so forth are stored in a nonvolatile memory, such as a flash memory. Among the programs 421, the setting data, and so forth, unchanged ones may be stored in a mask ROM beforehand. The measurement log 422 and the graph display data 423 are stored in the RAM in this embodiment, but they may be stored in a nonvolatile memory.

The programs 421 include a program for causing the sensor 47 to perform measurement and displaying measured values. The measurement log 422 stores measured values of a physical amount(s) measured by the sensor 47 correlated with time information. The time information may be information on a starting date and time of continuous measurement and a measurement interval(s). If (types of) the measurement intervals correspond to respective predetermined measurement modes, the measured values may be stored with their corresponding measurement modes, or information on a measurement mode may be stored only when the measurement is started and when the measurement mode is changed. The capacity of the memory 42 used for storing the measurement log 422 is predetermined. When the amount of data that the memory 42 stores reaches the upper limit, new measured values should be added while old measured values are deleted in order one by one or in units of some measured values.

The graph display data 423 is data indicating contents that are displayed by the digital display screen 11 on the basis of data of the measurement results stored in the measurement log 422. The graph display data 423 may be data indicating whether to turn on (light up) respective pixels or its compressed data, or may be intermediate data between the data of the measurement results and the data indicating whether to turn on respective pixels. The graph display data 423 may include information on a display scale (at least one of the maximum value and the minimum value to be displayed on the vertical axis; and a difference between values to be displayed indicated by one division (pixel) (unit difference value)).

The oscillator circuit 43 generates and outputs a predetermined frequency signal(s). The oscillator circuit 45 includes, for example, a crystal oscillator.

The frequency divider circuit 44 divides the frequency signal output from the oscillator circuit 43, thereby converting the frequency signal into a signal of a frequency that is utilized by the CPU 41 or the timer circuit 45, and outputs the signal. The frequency output from the frequency divider circuit 44 may be changeable in accordance with a control signal from the CPU 41.

The timer circuit 45 counts the signals of the frequency input from the frequency divider circuit 44 and adds the same to an initial value indicating a predetermined date and time, thereby calculating the current date and time. The date and time calculated by the timer circuit 45 has a margin of error (rate) that corresponds to accuracy of the oscillator circuit 43. The magnitude of the margin of error is, for example, 0.5 seconds per day. The date and time calculated by the timer circuit 45 can be corrected in accordance with a control signal from the CPU 41.

The satellite radio wave receiver/processor 46 receives radio waves with the antenna AN1 from positioning satellites including at least global positioning system (GPS) satellites. The satellite radio wave receiver/processor 46 demodulates radio waves sent from these positioning satellites by spread spectrum to decode or decrypt signals (navigation message data). The satellite radio wave receiver/processor 46 decrypts code strings of the received and demodulated navigation message, and performs various types of arithmetic processing thereon as needed, thereby obtaining the date-and-time information, the current position information, and so forth. The obtained information is sent to the CPU 41 at appropriate timing in a format specified by the CPU 41.

The sensor 47 measures a predetermined physical amount(s) and outputs measured values. In this embodiment, the sensor 47 has a barometric pressure sensor 471. The measurement interval(s) at which the sensor 47 measures the physical amount may be changeable in accordance with an instruction by the CPU 41. Alternatively, the sensor 47 may measure the physical amount at predetermined measurement intervals, and the CPU 41 may obtain necessary data only. If the measurement interval(s) is wide/long, the whole sensor 47 or the sensor(s) of the sensor 47 may temporarily stop operating between measurement times. The sensor 47 may include a temperature sensor and/or an orientation sensor.

The driver circuit 48 outputs drive signals to the stepping motors 81 to 83 to operate. The CPU 41 outputs control signals to the driver circuit 48 to rotate the hands 61 to 63. In accordance with the control signals from the CPU 41, the driver circuit 48 outputs drive pulses of a predetermined voltage to the stepping motors 81 to 83 to rotate rotors of the stepping motors 81 to 83 a predetermined angle (e.g. 180 degrees) with respect to their respective stators. The driver circuit 48 can change the length of drive pulses (pulse width) on the basis of the status or the like of the electronic timepiece 1. If the driver circuit 48 receives a control signal(s) to drive two or more hands at the same time, the driver circuit 48 may slightly shift output timings of drive pulses from one another in order to reduce the load of the electronic timepiece 1.

The operation receiver 51 receives operations input from the user. The operation receiver 51 includes the crown C1 and the push-button switches B1, B2. When the crown C1 is pulled, pushed back or rotated, the operation receiver 51 detects a signal corresponding to the type of the operation, and outputs a signal corresponding to the detected signal to the CPU 41. The crown C1 can be pulled to the first level and the second level, and the operation receiver 51 receives contents of operations (signals) corresponding to the pulled states. When the push-button switch B1 or B2 is pressed, the operation receiver 51 detects this state, and outputs a signal indicating that the push-button switch B1 or B2 is in a pressed state to the CPU 41. Hence, while the push-button switch B1 or B2 keeps being pressed, the operation receiver 51 continuously outputs signals during the state. The operation receiver 51 may include a touchscreen.

The display drive unit 52 outputs drive signals to the digital display screen 11. The display drive unit 52 outputs signals indicating whether to turn on the pixels arranged and signals indicating whether to turn on the segment marks provided near the upper edge part of the digital display screen 11.

The power supply unit 91 supplies power necessary for each component to operate with a predetermined voltage from a battery 911. The battery 911 includes, for example, a solar panel and a secondary cell. Alternatively, the battery 911 may be a removable dry button cell. If the power supply unit 91 outputs different voltages, the power supply unit 91 may include, for example, a switched-mode power supply, and convert a voltage into a desired voltage and output the desired voltage.

The stepping motor 81 rotates the second hand 61 via the gear train mechanism 71, which is constituted of gears arranged. When the stepping motor 81 is driven one time, the second hand 61 rotates six degrees. Hence, when the stepping motor 81 operates 60 times, the second hand 61 makes one revolution on the dial 3.

The stepping motor 82 rotates the minute hand 62 via the gear train mechanism 72. When the stepping motor 82 is driven one time, the minute hand 62 rotates one degree. Hence, when the stepping motor 82 operates 360 times, the minute hand 62 makes one revolution on the dial 3.

The stepping motor 83 rotates the hour hand 63 via the gear train mechanism 73. When the stepping motor 83 is driven one time, the hour hand 63 rotates one degree. Hence, when the stepping motor 83 operates 360 times, the hour hand 63 makes one revolution on the dial 3. The hands 61 to 63 may rotate independently, and also may have their respective predetermined rotational positions.

Although not specifically limited, the hands 61 to 63 can rotate in both the normal rotation direction (clockwise) and the counter rotation direction (counterclockwise) at speeds of up to 400 ppm (pulse per second) (maximum speed). The electronic timepiece 1 may be able to control the hands 61 to 63 to rotate at multiple fast sending speeds (fast moving speeds).

The hands 61 to 63, the gear train mechanisms 71 to 73, the stepping motors 81 to 83, the driver circuit 48, the digital display screen 11, and the display drive unit 52 are included in the display unit 10 of this embodiment.

Next, the digital display screen 11 and how to display measurement results in the electronic timepiece 1 of this embodiment will be described.

FIG. 3A to FIG. 3D are illustrations to explain the digital display screen 11 and what the digital display screen 11 displays.

Figure 3A:
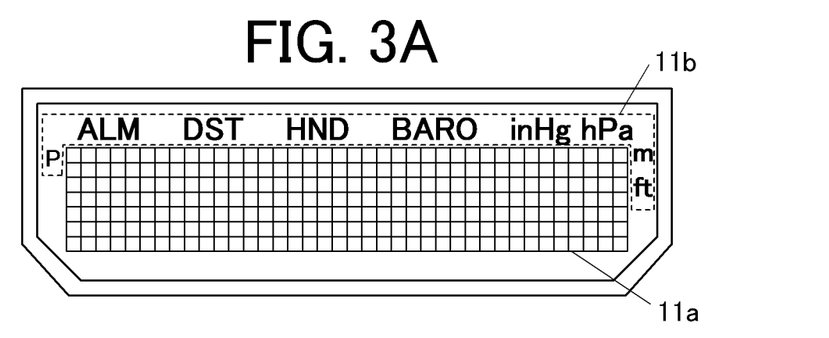
FIG. 3A is an illustration to explain a digital display screen and what the digital display screen displays.

As shown in FIG. 3A, the digital display screen 11 includes: a dot matrix display area 11a; and an area 11b that is provided near the dot matrix display area 11a and where the segment marks are displayed. The dot matrix display area 11a has a size with which at least two alphanumerics are displayable. In this embodiment, the pixels are arranged in 7 rows×38 columns as an example. The area 11b has the segment marks, such as "P" representing afternoon. The marks include "BARO" that is turned on at the time of barometric pressure measurement, "hPa" and "inHg" that represent units of barometric pressure, and "m" (meters) and "ft" (feet) that represent units of altitude into which values of barometric pressure are converted to be displayed. The character size of these marks is smaller than the size of characters (alphanumerics) displayed in the dot matrix display area 11a with a dot matrix.

Figure 3B:
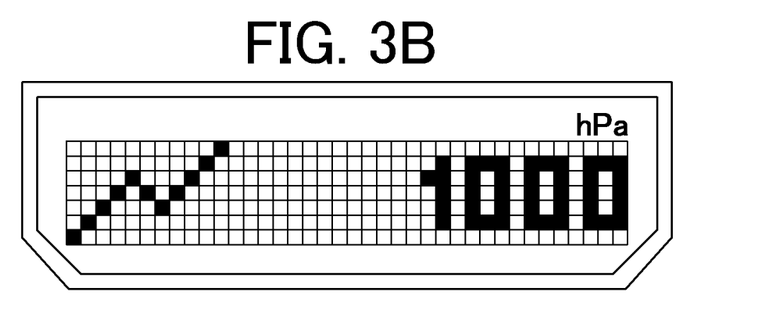
FIG. 3B is an illustration to explain the digital display screen and what the digital display screen displays.

The electronic timepiece 1, in a normal measurement mode, obtains data of a barometric pressure value from the barometric pressure sensor 471 of the sensor 47 and displays the value once every two hours. Such settings of measurement modes are stored, for example, in the memory 42. On the basis of the settings, the CPU 41 may start, at an obtaining timing of a measurement result, a process of time measurement to the next obtaining timing, or may be scheduled to generate, at the next obtaining timing, a command to obtain a measurement result as an interrupt signal. As shown in FIG. 3B, the digital display screen 11 can display both the current barometric pressure value and a graph showing a shift in barometric pressure (measurement results). The unit difference value on the vertical axis that represents barometric pressure in the graph, a change amount of barometric pressure values indicated one pixel in this embodiment (e.g. a unit of 2 hPa), is specified by the settings. In general, the unit difference value on the vertical axis is equal to or greater than resolution of measured values by the sensor 47 (e.g. 0.1 hPa).

The electronic timepiece 1 automatically changes a display range of a graph such that the latest value is within the display scale (between the maximum value and the minimum value to be displayed on the vertical axis). That is, points except the point of the latest value may be outside the display scale and not displayed. In this embodiment, the graph shows barometric pressure with turned-on black dots. Herein, "turn on" or the like means change in the display state of liquid crystal from its display state with no power supply. This change occurs by change in the polarization state of the liquid crystal due to application of a voltage. This change in the display state includes a case where light (backlight) is not transmitted (black dots in normally white).

Figure 3C:
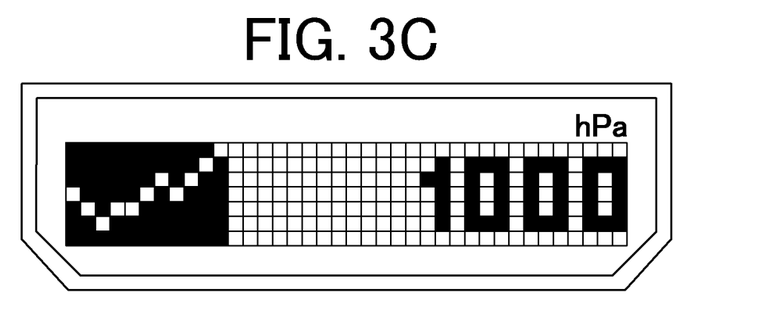
FIG. 3C is an illustration to explain the digital display screen and what the digital display screen displays.

The electronic timepiece 1, in a high-frequency measurement mode of barometric pressure, obtains data of a barometric pressure value and displays the value once every two minutes. As shown in FIG. 3C, the graph displayed in the high-frequency measurement mode is made to have a different color tone from that of the graph displayed in the normal measurement mode by reversing black and white as the foreground color and the background color. In the case shown in FIG. 3C, white points displayed in a black part as the background represent barometric pressure values obtained at two-minute intervals. This easily shows that the user in which mode the measurement is being performed, without adding and using a small mark. That is, the CPU 41 can change an obtaining interval(s) (approximately equal/ corresponding to the measurement interval(s)) at which the CPU 41 obtains measurement results of barometric pressure to another by switching the measurement mode to another.

In the high-frequency measurement mode, continuous measurement time may have the maximum time. The electronic timepiece 1 (CPU 41) may start, at the time of shifting to the high-frequency measurement mode, a process of time measurement to the maximum time, or may be scheduled to generate, at the time when the maximum time elapses, an interrupt signal to end the high-frequency measurement mode and return to the normal measurement mode.

Figure 3D:
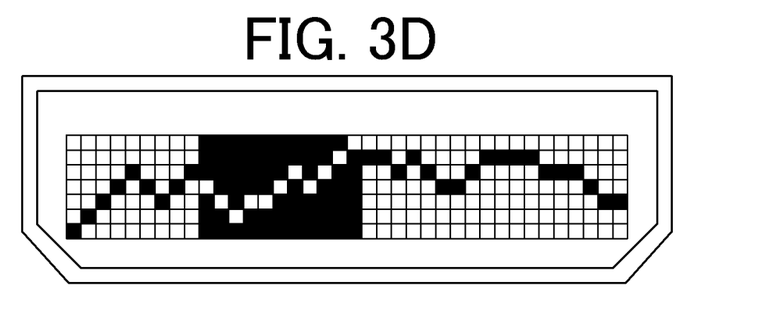
FIG. 3D is an illustration to explain the digital display screen and what the digital display screen displays.

The electronic timepiece 1 can display graphs in both measurement modes continuously (to be one graph) in response to switching one measurement mode to another, namely changing one type of measurement interval to another, in the middle of measurement. The electronic timepiece 1 can display the graph(s) only, without displaying the current barometric pressure value. As shown in FIG. 3D, in the middle of measurement in the normal measurement mode in which barometric pressure is represented by black dots, measurement results of measurement in the high-frequency measurement mode in which barometric pressure is represented by white dots are inserted. As described above, the measurement interval in the normal measurement mode is two hours, and the measurement interval in the high-frequency measurement mode is two minutes. Hence, the reduced scale on the horizontal axis differs between the measurement modes. As shown in FIG. 3D, even if measurement results in different time scales coexist, and are displayed at equal intervals regardless of their actual obtaining intervals in order in which the measurement results are obtained, the actual obtaining intervals are easily distinguishable from one another by the color tone being changed, in particular, by the colors used as the foreground color and the background color being reversed. Herein, "changing the color tone" or the like means not only changing a color(s) (density, such as grayscale, included) used for display to another color(s), but also exchanging the foreground color and the background color as described above.

Figure 4:
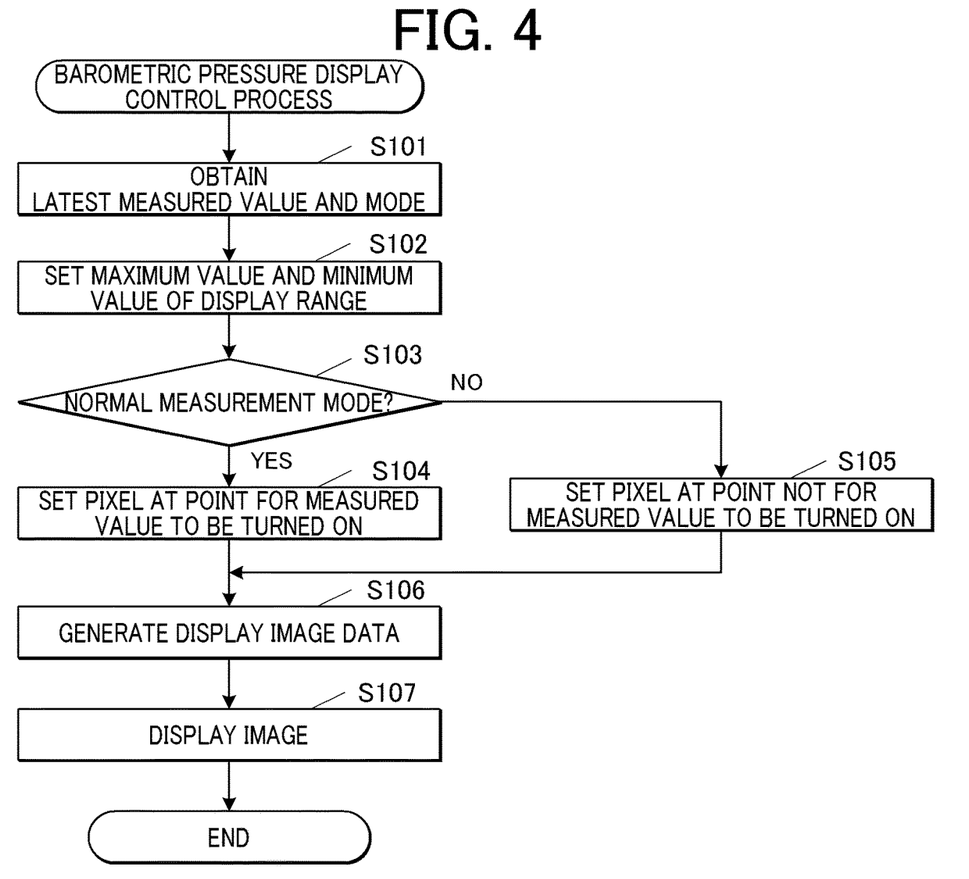
FIG. 4 is a flowchart showing a control procedure in a barometric pressure display control process.

FIG. 4 is a flowchart showing a control procedure by the CPU 41 in a barometric pressure display control process that is performed in the electronic timepiece 1 of this embodiment. At least part of this process corresponds to a display step of this embodiment. This process is started every time a measurement interval elapses once a barometric pressure measurement command is obtained.

When the barometric pressure display control process is started, the CPU 41 obtains the latest measured value of barometric pressure from the barometric pressure sensor 471, and also obtains the information on the settings of the current measurement mode (Step S101). The CPU 41 refers to the graph display data 423, and sets a new display range (the maximum value and the minimum value to be displayed on the vertical axis) on the basis of the information on the display scale and the information on the value obtained this time (Step S102).

The CPU 41 determines whether the latest measured value has been obtained in the normal measurement mode (Step S103). If the CPU 41 determines that the latest measured value has been obtained in the normal measurement mode (Step S103: YES), the CPU 41 sets a pixel at a point for the measured value in accordance with the display scale to be turned on and the other pixels of the same column to be turned off (Step S104). Then, the CPU 41 proceeds to Step S106. If the CPU 41 determines that the latest measured value has not been obtained in the normal measurement mode, namely has been obtained in the high-frequency measurement mode (Step S103: NO), the CPU 41 sets a pixel at a point for the measured value in accordance with the display scale to be turned off and the other pixels of the same column to be turned on (Step S105).

The CPU 41 generates display image data by adding the pixel column, which is set in Step S104 or Step S105 for the value obtained this time, to the rightmost column of the last display range (Step S106). If the display image data generated last time already has a predetermined maximum number of columns, the CPU 41 generates display image data having the maximum number of columns by adding the above-described pixel column and deleting the leftmost column, namely the pixel column displaying the oldest measured value. The CPU 41 outputs a control signal to the display drive unit 52 on the basis of the generated display image data to update display contents of the digital display screen 11 (Step S107). Then, the CPU 41 ends the barometric pressure display control process.

Figure 5:
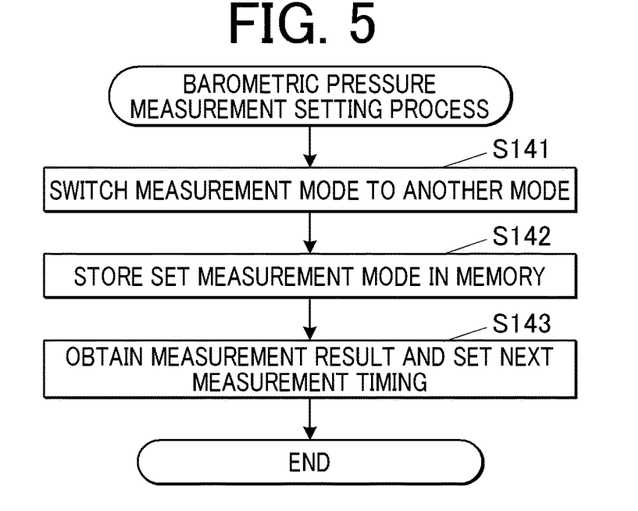
FIG. 5 is a flowchart showing a control procedure in a barometric pressure measurement setting process.

FIG. 5 is a flowchart showing a control procedure by the CPU 41 in a barometric pressure measurement setting process. At least part of this process corresponds to a change step of this embodiment. This process is started when a measurement mode switching command is obtained, for example, from the operation receiver 51 receiving a predetermined operation input from the user, or when the continuous measurement time in the high-frequency measurement mode reaches the maximum time.

When the barometric pressure measurement setting process is started, the CPU 41 switches the measurement mode to a mode different from the current mode (Step S141). The CPU 41 stores the newly set measurement mode in the memory 42 (Step S142). The CPU 41 obtains a measurement result of barometric pressure from the sensor 47 and sets the next measurement timing in the newly set measurement mode (Step S143). Then, the CPU 41 ends the barometric pressure measurement setting process.

Figure 6A:
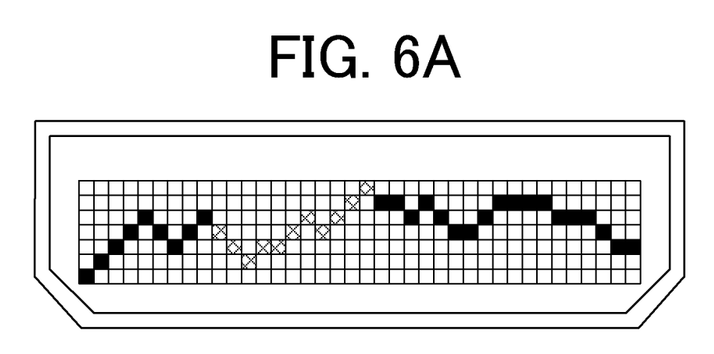
FIG. 6A shows an modification of a graph displayed by the digital display screen.
Figure 6B:
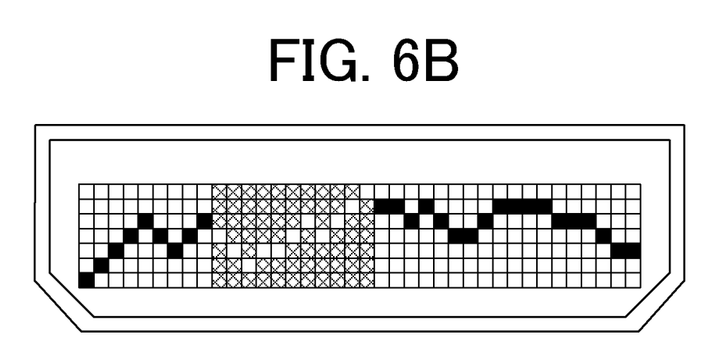
FIG. 6B shows another modification of the graph displayed by the digital display screen.

FIG. 6A and FIG. 6B show modifications of the graph displayed by the digital display screen 11.

As shown in FIG. 6A, if the digital display screen 11 can perform grayscale display, namely display with multiple levels of density, the CPU 41 may control display-density change and thereby change the density for pixels to be turned on, the pixels corresponding to measured values, such that the density differs between the measurement modes. If the density is too close/similar to the background color, the graph (measured values/measurement results) becomes difficult to see, and if the density difference between the measurement modes is too small, distinction between the measurement modes becomes difficult to make. Taking these into account, the density should be determined properly.

Alternatively, as shown in FIG. 6B, in addition to reversing the colors so that the color tone differs between the measurement modes, the CPU 41 may lower the density for pixels to be turned on, in a measurement mode in which a large number of pixels are turned on, the high-frequency measurement mode in this embodiment. Similarly, if the digital display screen 11 can perform multiple color display, the CPU 41 may change the display color(s) such that the display color differs between the measurement modes.

As described above, the electronic timepiece 1 of this embodiment includes the display unit 10 having the digital display screen 11, the sensor 47 that measures a predetermined physical amount(s), and the CPU 41. The CPU 41 can change an obtaining interval(s) at which the CPU 41 obtains measurement results of the measurement by the sensor 47 (barometric pressure sensor 471 in this embodiment), in this embodiment, between two minutes and two hours; causes the digital display screen 11 to display a graph that shows a shift in the measurement results; and changes a display mode (e.g. color tone) of the graph in a section in the graph depending on the obtaining interval, wherein the digital display screen 11 does not display a mark representing the obtaining interval while displaying the graph.

This changes representation of a graph without using a mark or the like, and hence does not require a space where a mark is provided, and also does not make the narrow digital display screen 11 more complicated. Further, the above changes, for example, the color tone depending on the obtaining interval, and consequently allows the user to intuitively, promptly and certainly understand that which obtaining interval has/is being used. Thus, the electronic timepiece 1 can improve understandability of a graph displayed in a limited screen.

Further, in response to changing the obtaining interval with the digital display screen 11 being in the middle of displaying the graph, which shows a shift in the measurement results, the CPU 41 makes the color tone of the graph relevant to, among the measurement results, a measurement result(s) obtained after changing the obtaining interval different from the color tone of the graph relevant to, among the measurement results, a measurement result(s) obtained before changing the obtaining interval, and causes the display to display the graph(s) continuously. This indicates different obtaining intervals by color tone change only, and consequently allows the user to promptly understand that in which section which obtaining interval is used even if multiple types of obtaining intervals coexist.

Further, the CPU 41 causes the digital display screen 11 to display, in the graph, the measurement results at equal intervals in order in which the CPU 41 obtains the measurement results, regardless of the obtaining interval(s). This displays the measurement results continuously at equal intervals regardless of their actual obtaining intervals, and consequently can display a larger number of measurement results efficiently, in particular, in a limited display area while allowing the user to easily judge and understand that measurement results displayed in which section have been obtained at which obtaining interval(s).

Further, the digital display screen 11 displays the graph in a single color, monochromatically in this embodiment, and the CPU 41 changes the color tone by reversing the background color and the foreground color such that the color tone differs between the sections in the graph relevant to one of two types of the obtaining interval that can be changed and the graph relevant to the other of the two types. This changes representation of a graph greatly by simple color reversal only, and consequently allows the user to easily see and identify the types of the obtaining interval(s) with limited resources.

Further, the CPU 41 changes the color tone by changing the display density depending on the obtaining interval. If display with multiple levels of density, such as grayscale, is performable, changing the density for pixels to be turned on alone allows the user to understand the obtaining interval of each data. In this case, the number of pixels to be turned on does not need to be changed either.

Further, the display unit 10 has the hands 61 to 63 that rotate, and the digital display screen 11 is provided at a part of the dial 3 that is indicated by the hands 61 to 63. Because this narrow digital display screen 11 of the electronic timepiece 1 where a digital display unit and an analog display unit are combined displays a graph such that (types of) obtaining intervals are distinguishable from one another as described above, marks therein can be prevented from being too small to be legible. Further, because no additional mark is needed, arrangement of the marks can be prevented from being complicated. Still further, because the number of pixels therein is limited, as compared with a case where obtained values are displayed for example, by a broken line or a bold line, the obtained values can be displayed for sure without a decrease in display accuracy.

Further, this embodiment is a display method that causes the display unit 10 having the digital display screen 11 to display a graph that shows measurement results of measurement by the sensor 47 that measures a predetermined physical amount(s). The display method includes a display step of causing the digital display screen 11 to display the graph that shows a shift in the measurement results of the measurement by the sensor 47 (barometric pressure sensor 471), a change step of changing an obtaining interval(s) at which the measurement results by the sensor 47 are obtained, wherein the digital display screen 11 does not display a mark representing the obtaining interval while displaying the graph, and the display step includes changing a display mode (e.g. color tone) of the graph in a section in the graph depending on the obtaining interval. This changes representation of a graph itself depending on the obtaining interval without cramming an additional mark in the narrow digital display screen 11, and consequently allows the user to intuitively, promptly and certainly understand that which obtaining interval has/is being used. Thus, the display method can improve understandability of a graph displayed in a limited screen.

The present invention is not limited to the above embodiment and can be variously modified.

For example, although in the embodiment, two types of measurement modes are present and switched, three or more types of measurement modes may be present. In this case, these three types of measurement modes may be switched in order, or the current measurement mode may be directly switched to a desired measurement mode. In either case, different color tones are used for the respective measurement modes in displaying a graph(s).

Further, although in the embodiment, all the obtained measurement results are displayed in order in the respective columns regardless of their obtaining intervals at which the measurement results are obtained, there may be some space (a column(s)) depending on the obtaining interval between columns displaying measurement results. In this case too, measurement results do not need to be displayed with a ratio of intervals equal to a difference between the actual obtaining intervals.

Further, although in the embodiment, a line graph is displayed, another type of graph, for example, a column graph, may be displayed. In this case too, measurement results obtained with different obtaining frequencies can be displayed in the same manner as described above.

Further, although in the embodiment, the normally white digital display screen 11 displays the foreground (measured values) in black while the measured values are obtained at the normal obtaining interval(s) and displays the background in black by color reversal if the obtaining interval(s) is made narrow/short, this may be reversed. That is, the digital display screen 11 may perform display such that a small number of pixels are turned on in a mode in which measurement and updates of representation of a graph are performed with high frequency.

Further, although in the embodiment, the electronic timepiece 1 performs all the setting, measurement, and display, the electronic timepiece 1 may have a communication unit using Bluetooth® or the like, and be able to obtain settings of measurement modes from an external electronic device(s) and send measurement results to the external electronic device(s).

Further, although in the embodiment, the electronic timepiece 1 can perform both analog display and digital display, the electronic timepiece 1 may be able to perform digital display only. Still further, the digital display screen 11 is not limited to the liquid crystal display screen, and may be a display screen using another display system, such as an organic EL (Electro-Luminescent) display or a display screen using LEDs (Light Emitting Diodes). Yet further, the present invention is applicable to not only electronic timepieces but also any electronic device that performs digital display.

Further, although in the embodiment, measurement results of barometric pressure are displayed, even if measurement results of another physical amount, such as temperature, are displayed, display control similar to the above can be performed. Still further, as measurement results, not barometric pressure (measured values) itself but, for example, a parameter or a differential amount calculated from the barometric pressure (measured values) may be displayed.

Besides, the specific details of the components, configuration of each component, control contents, and so forth described in the above embodiment can be appropriately modified without departing from the scope of the present invention.

Although one or more embodiments have been described, the scope of the present invention is not limited to the embodiments, and includes the scope of claims below and the scope of their equivalents.

What is claimed is:

1. An electronic device comprising:
a processor that is configured to:
obtain measurement results of a measurement by a sensor at a set obtaining interval, wherein the sensor measures a predetermined physical amount;
change the set obtaining interval at which the processor obtains the measurement results of the measurement by the sensor from a first obtaining interval to a second obtaining interval;
control a display to display a graph that shows a shift in the measurement results; and
in controlling the display to display the graph, set a display mode of the graph to at least one of a first display mode and a second display mode in correspondence with the set obtaining interval, such that a first section of the graph showing a shift in measurement results obtained at the first obtaining interval is displayed in the first display mode, and a second section of the graph showing a shift in measurement results obtained at the second obtaining interval is displayed in the second display mode,
wherein the processor is further configured to:
control the display to display the graph by turning off a pixel that shows a foreground color and turning on a pixel that shows a background color in response to changing the set obtaining interval to a shorter obtaining interval between the first obtaining interval and the second obtaining interval, to thereby display the graph in one of the first display mode and the second display mode; and
control the display to display the graph by turning on the pixel that shows the foreground color and turning off the pixel that shows the background color in response to changing the set obtaining interval to a longer obtaining interval between the first obtaining interval and the second obtaining interval, to thereby display the graph in the other of the first display mode and the second display mode.

2. The electronic device according to claim 1, wherein in controlling the display to display the graph, the processor is configured to control the display to display the first section in the graph showing the shift in measurement results obtained at the first obtaining interval with a first color tone as the first display mode, the first color tone being determined by the foreground color, and to display the second section of the graph showing the shift in measurement results obtained at the second obtaining interval in a second color tone different from the first color tone, as the second display mode, the second color tone being determined by the foreground color.

3. The electronic device according to claim 2, wherein in response to receipt of an instruction to change the set obtaining interval from the first obtaining interval to the second obtaining interval during display of the graph, the processor is configured to set a color tone of the graph in the second section of the graph, which shows the shift in measurement results obtained after changing the set obtaining interval from the first obtaining interval to the second obtaining interval, to the second color tone which is different from the first color tone of the graph in the first section of the graph showing the shift in measurement results obtained at the first obtaining interval before changing the set obtaining interval from the first obtaining interval to the second obtaining interval, and causes the display to display the first section of the graph and the second section of the graph continuously and simultaneously.

4. The electronic device according to claim 3, wherein the processor is configured to change the color tone from the first color tone to the second color tone by changing a display density such that the first color tone has a first display density and the second color tone has a second display density different from the first display density.

5. The electronic device according to claim 3, further comprising the display, a display plate, and a hand,
wherein the display is provided at a part of the display plate that is indicated by the hand.

6. The electronic device according to claim 3, wherein the processor is configured to control the display to display the graph in a single color, and the processor is configured to change the color tone from the first color tone to the second color tone by reversing the background color and the foreground color such that the first color tone of the first section differs from the second color tone of the second section in the graph.

7. The electronic device according to claim 2, wherein the processor is configured to control the display to display, in the graph, the measurement results at equal display intervals in an order in which the processor obtains the measurement results, regardless of the set obtaining interval at which the measurement results are obtained, such that the display interval is the same for measurement results obtained at the first obtaining interval and measurement results obtained at the second obtaining interval.

8. The electronic device according to claim 2, wherein the processor is configured to control the display to display the graph in a single color, and the processor is configured to change a color tone from the first color tone to the second color tone by reversing the background color and the foreground color such that the first color tone of the first section differs from the second color tone of the second section in the graph.

9. The electronic device according to claim 2, wherein the processor is configured to change a color tone from the first color tone to the second color tone by changing a display density such that the first color tone has a first display density and the second color tone has a second display density different from the first display density.

10. The electronic device according to claim 2, further comprising the display, a display plate, and a hand,
wherein the display is provided at a part of the display plate that is indicated by the hand.

11. The electronic device according to claim 1, wherein the processor is configured to control the display to display, in the graph, the measurement results at equal display intervals in an order in which the processor obtains the measurement results, regardless of the set obtaining interval at which the measurement results are obtained, such that the display interval is the same for measurement results obtained at the first obtaining interval and measurement results obtained at the second obtaining interval.

12. The electronic device according to claim 11,
wherein the processor is configured to control the display to display the first section in the graph showing the shift in measurement results obtained at the first obtaining interval with a first color tone as the first display mode, and to display the second section of the graph showing the shift in measurement results obtained at the second obtaining interval in a second color tone different from the first color tone, as the second display mode, and wherein the processor is configured to control the display to display the graph in a single color, and the processor is configured to change a color tone of the graph from the first color tone to the second color tone by reversing the background color and the foreground color such that the first color tone of the first section differs from the second color tone of the second section in the graph.

13. The electronic device according to claim 11,
wherein the processor is configured to control the display to display the first section in the graph showing the shift in measurement results obtained at the first obtaining interval with a first color tone as the first display mode, and to display the second section of the graph showing the shift in measurement results obtained at the second obtaining interval in a second color tone different from the first color tone, as the second display mode, and wherein the processor is configured to change a color tone from the first color tone to the second color tone by changing a display density such that the first color tone has a first display density and the second color tone has a second display density different from the first display density.

14. The electronic device according to claim 1, further comprising the display, a display plate, and a hand,
wherein the display is provided at a part of the display plate that is indicated by the hand.

15. The electronic device according to claim 1, wherein the processor is configured to control the display so as not to display a mark representing either of the first obtaining interval or the second obtaining interval while displaying the graph.

16. A display method for an electronic device including a processor, the method comprising:
obtaining, by the processor, measurement results of a measurement by a sensor at a set obtaining interval, wherein the sensor measures a predetermined physical amount;

changing, by the processor, the set obtaining interval at which the measurement results are obtained from a first obtaining interval to a second obtaining interval, controlling, by the processor, a display to display a graph that shows a shift in the measurement results; and in controlling the display to display the graph, setting a display mode of the graph to at least one of a first display mode and a second display mode in correspondence with the set obtaining interval, such that a first section of the graph showing a shift in measurement results obtained at the first obtaining interval is displayed in the first display mode, and a second section of the graph showing a shift in measurement results obtained at the second obtaining interval is displayed in the second display mode, wherein said controlling the display to display the graph comprises:

controlling the display to display the graph by turning off a pixel that shows a foreground color and turning on a pixel that shows a background color in response to changing the set obtaining interval to a shorter obtaining interval between the first obtaining interval and the second obtaining interval, to thereby display the graph in one of the first display mode and the second display mode; and controlling the display to display the graph by turning on the pixel that shows the foreground color and turning off the pixel that shows the background color in response to changing the set obtaining interval to a longer obtaining interval between the first obtaining interval and the second obtaining interval, to thereby display the graph in the other of the first display mode and the second display mode.

17. The display method according to claim 16, wherein said controlling the display to display the graph comprises controlling the display to display the first section in the graph showing the shift in measurement results obtained at the first obtaining interval with a first color tone as the first display mode, the first color tone being determined by the foreground color, and to display the second section of the graph showing the shift in measurement results obtained at the second obtaining interval in a second color tone different from the first color tone, as the second display mode, the second color tone being determined by the foreground color.

18. The display method according to claim 17, further comprising:
receiving an instruction to change the set obtaining interval from the first obtaining interval to the second obtaining interval during display of the graph, and in response to receipt of the instruction, setting a color tone of the graph in the second section of the graph, which shows the shift in measurement results obtained after changing the set obtaining interval from the first obtaining interval to the second obtaining interval, to the second color tone which is different from the first color tone of the graph in the first section of the graph showing the shift in measurement results obtained at the first obtaining interval before changing the set obtaining interval from the first obtaining interval to the second obtaining interval, and controlling the display to display the first section of the graph and the second section of the graph continuously and simultaneously.

19. The display method according to claim 16, wherein said controlling the display to display the graph comprises controlling the display to display, in the graph, the measurement results at equal display intervals in an order in which the processor obtains the measurement results, regardless of the set obtaining interval at which the measurement results are obtained, such that the display interval is the same for measurement results obtained at the first obtaining interval and measurement results obtained at the second obtaining interval.

* * * * *